Sept. 6, 1927.  C. H. WOODRUFF  1,641,244
PLANT PROTECTOR
Filed Dec. 13, 1923
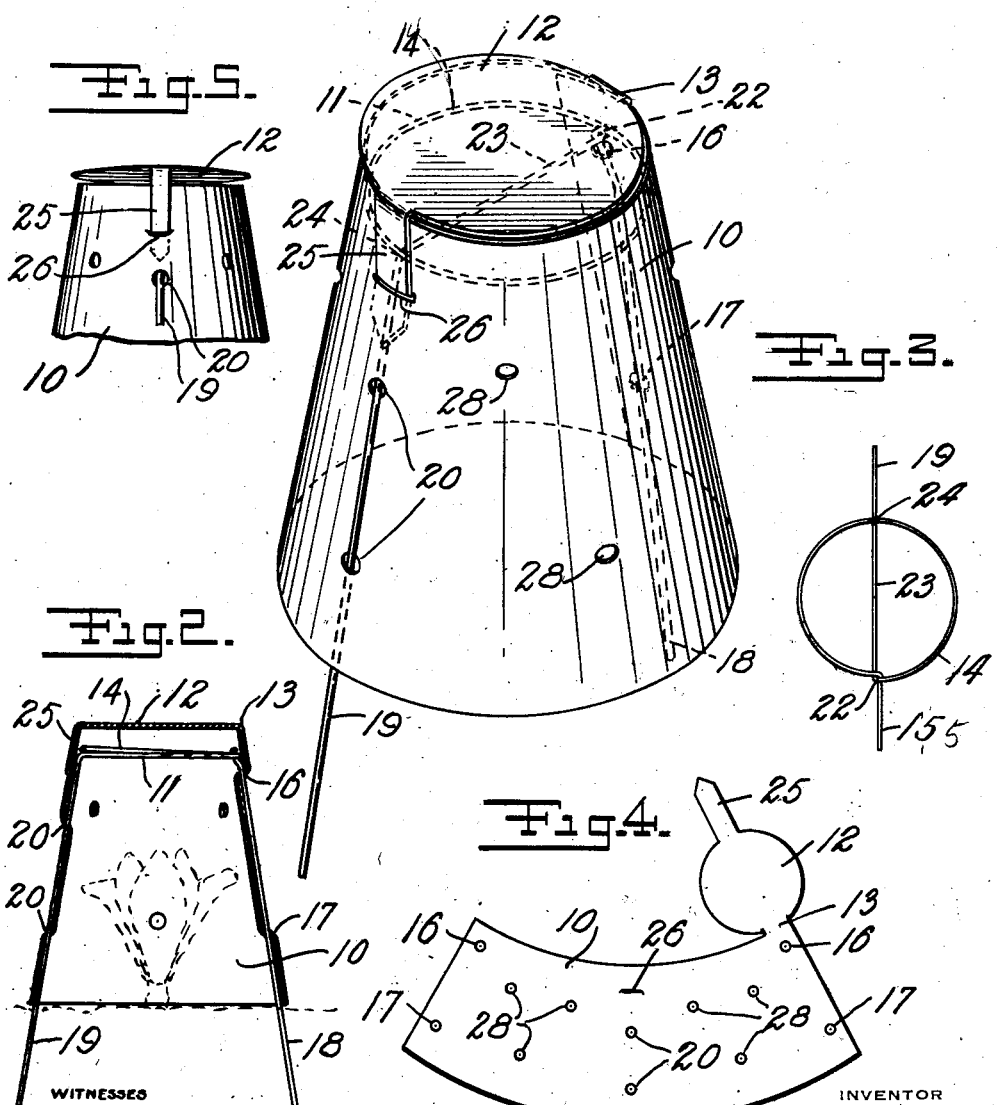
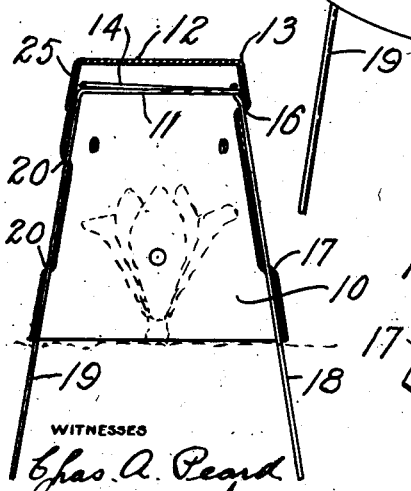
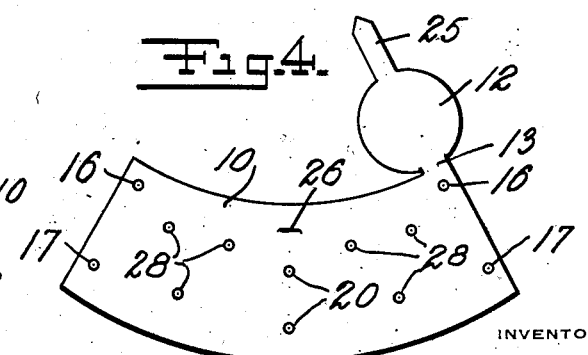

Patented Sept. 6, 1927.

1,641,244

UNITED STATES PATENT OFFICE.

CHRISTINE H. WOODRUFF, OF WESTFIELD, NEW JERSEY.

PLANT PROTECTOR.

Application filed December 13, 1923. Serial No. 680,384.

My invention relates to agricultural implements and more particularly to a protective covering for young and tender plants.

After a plant has been transplanted and during the period that its tender and fine roots are getting into capillary contact with the soil and until the plant has obtained sufficient size to resist its natural enemies, it is necessary that the plant be protected from the severe conditions of nature as well as from worms and insects. To this end, it is customary for the gardener to cover the young plant with either a piece of paper or some other makeshift. However, such makeshifts are not always satisfactory as they are not fitted to meet all of the elements which may work injury to the plant, such as intense sunlight and heat, frost, rain and wind and cut worms and insects which pervade the garden.

It is accordingly the main object of my invention to provide a plant protector which will overcome the objections above explained and which will not only be serviceable for guarding the plant from rain, wind, frost and the like but will ward off the major portion of the intense sun's rays and yet permit a desired amount of the life-giving heat and light to be transmitted to the plant.

It is a further object of my invention to provide a simple, durable and economical device which may be easily manufactured and sold at a low cost, which may be quickly assembled and safely shipped and stored, and which may be placed in position over the plant with the minimum expenditure of labor and time.

It is a still further object of my invention to provide a simple device which may be adjusted easily and at will to provide more or less ventilation for the plant and yet which will remain firmly anchored in a wind storm and insure the right amount of protection for the plant.

With these and other objects in view, as will be apparent to one skilled in the art, my invention resides in the combination of parts set forth in the specification and covered by the claims appended hereto.

Referring to the drawings which illustrate one embodiment of my invention and in which like reference numerals indicate like parts:

Fig. 1, is a perspective view of my plant protector;

Fig. 2, is the vertical section thereof showing it in position on the ground;

Fig. 3 is a top plan view of the wire frame support of the device;

Fig. 4, is a plan view of the paper covering after it has been cut and before it is assembled on the frame; and Fig. 5, is a fragmentary front elevation showing the cover slightly lifted.

In accordance with my invention, I make a plant protector casing 10 of a suitable inexpensive material, such as paper, and mount and support the casing, shaped as a tube, on a frame 11 which is arranged to be inserted into the ground. A disk shaped cover 12 is adjustably positioned over the upper open end of the tube in order to provide a desired degree of ventilation within the plant protecting chamber, the wall of the tube being suitably perforated to aid in carrying out this object.

If paper is employed for the tube material, I preferably select a heavy tough paper which has been rendered water-proof and non-combustible, such as may be found on the market. In order that subdued sunlight and heat may reach the plant, I use a paper which transmits yellow rays to some extent, but is not transparent to all light waves. This insures that the plant will not be overheated and hence become wilted during the precarious period after the transplanting operation.

A convenient shape for the translucent paper tube is that of a truncated cone, the smaller end of the frustum being at the top. This makes it feasible to use a small cover and better protect the plant from the elements. It, however, will be understood that the shapes and sizes of the various parts, and the nature of the material employed, is immaterial except insofar as defined by the appended claims.

One simple manner of forming the tube and cover is to fashion them from a single piece of paper, as shown in Fig. 4. The cover 12 may be made integral with the tube wall, sufficient paper stock being left at the junction to form a hinge 13 therebetween. While the tube ends may be glued or otherwise fastened together, I prefer, for the sake of convenience in manufacturing, assembling and shipping, to lap the edges of the paper and pin them together by means of a portion of the supporting frame threaded through perforations provided adjacent to the edges of the paper for this purpose.

The supporting frame is so constructed as to reinforce the flexible material of which the tube may be made, as well as to serve as a standard for anchoring and holding the frame firmly over a plant. As a convenient and cheap material therefor, I prefer to use a continuous piece of wire and I shape it to form a reinforcing loop 14 of circular configuration, which is arranged to fit preferably within the tube near its upper end. The two ends of the wire serve to fasten the ends of the paper together to form the tube, and to support the device on the ground. As illustrated, one end 15 may be threaded through the perforations 16 and 17 formed near the edges of the paper, the wire issuing outwardly through the aligned openings 16, passing downwardly along the tube wall and then inwardly through the lower set of perforations 17, whence it passes in contact with the inner side of the tube to the bottom and depends below as a supporting leg 18. The other wire end 19 is similarly passed through the perforations 20 and serves to strength and support that portion of the tube which is diametrically opposed to the lapped edges.

One simple way of making this frame is to bend the wire in the form of a loop and then cross the ends as shown at 22 in Figs. 1 and 3. The end 16 is bent downwardly to form one of the legs and the other portion is passed diametrically across the loop to form a stiffening brace 23 over the wire at the opposite side, where it is bent downwardly to form the other leg 19. If desired, a drop of solder may be applied at the point 24 where the leg 19 touches the loop 14, or these parts may be welded or otherwise secured together to hold the members firmly in position.

One important feature of my invention is that the cover shall be supported and held firmly in either a closed or a partially opened position. This may be accomplished by providing the cover with a long depending flap 25 and so constructing the various parts that this flap may be held frictionally in any desired position.

One simple expedient is to make a slit 26 in the tube through which the flap may be inserted, the slit being narrow and of such size that the edges afford a frictional grip upon the flap. To supplement this action, I prefer to locate the leg 19 of the frame in the rear of this slit and to have it fit snugly against the inner wall of the tube. By passing the flap through the slit 26 and downwardly between the tube wall and the leg 19, I obtain a frictional pressure upon the cover flap that will hold it securely in any desired position. The tube is provided with suitably located ventilating openings 28 so that upon raising the cover, an upward draft of circulating air may be obtained. By making the cover slightly larger than the opening at the top of the tube, rain or snow may be absolutely prevented from entering, and owing to the shape of the parts no water will accumulate on the top.

As illustrated, the upper holes 16 are placed near the top of the lapped edges so as to limit the relative downward movement of the wire frame. The loop 14 is of such a size as to be capable of insertion through the small end of the frustum and make a fairly close fit with the inside of the tube near its upper end. The paper tube is shown somewhat distorted in Fig. 2 to indicate clearly how the rods or legs are threaded through the perforations, it being understood however, that the flexibility of the materials employed permits the parts to be readily assembled. The construction is such that the gardener may pick up the device by grasping the tube near its upper end and then thrust the wires into the ground by a straight downward movement. The cross member 23 of the frame stiffens it for resisting such handling.

It will therefore be seen that I have provided in this construction a simple and serviceable device which will insure adequate protection for a young plant after it has been transplanted and which may be quickly adjusted to fit all types of weather.

In view of the above disclosure, various changes in the construction and shape of the parts will be obvious to one skilled in the art, and such modifications and equivalents are to be considered as falling within the scope of the appended claims.

Having thus described my invention, what I claim as new and desire to secure by Letters Patent is:—

1. A plant protector comprising a single piece of paper shaped to form a tube, a hinged cover for one end of the tube and a flap arranged for adjustment of the cover, a wire frame having a loop fitted within the upper portion of the tube to strengthen and support the same and a depending leg projecting below the tube for insertion into the ground and means to hold the flap in an adjusted position.

2. A plant protector comprising a paper tube having an adjustable cover over the upper end thereof, and a single piece of wire bent to form a loop and two depending legs, the loop being located within the upper portion of the tube to strengthen and support it and the legs being arranged to support opposite sides of the tube and be inserted into the ground.

3. A plant protector comprising a single sheet of flexible translucent water-proofed material bent in the form of a tube and having perforated lapped edges, a wire frame having a loop within the tube to support and strengthen it and a leg inserted through said perforations so as to secure the edges together and hold the tube in shape, a portion of said frame depending below the tube for insertion into the ground to form a support for the tube, a cover for the upper end of the tube, and means to hold it in a closed or a partially opened position.

4. A plant protector comprising a single sheet of paper having perforated edges lapped to form a tube, a cover for the top opening integral with and hinged to the tube and having a depending flap for adjusting the height of the cover, and a wire frame within the tube having a leg threaded through the perforated lapped edges to hold the tube in shape, said parts being so arranged that the flap may be frictionally held between the tube wall and the wire frame in a desired position.

5. A plant protector comprising a tube, an adjustable cover for the upper end thereof, a frame formed of a continuous piece of wire having a loop contacting with the inside of the tube, one end of the wire depending from one side of the loop and the other end passing diametrically across the loop and thence downwardly within and contacting with the inner wall of the tube, said legs being threaded through perforations in the tube to hold the parts together.

Signed at New York city this 12th day of December, 1923.

CHRISTINE H. WOODRUFF.